United States Patent Office 3,080,349
Patented Mar. 5, 1963

3,080,349
POLYMERIZATION WITH THE AID OF A CATALYST CONTAINING ALUMINUM HALIDE AND AN ORGANO-MERCURY COMPOUND IN A HALOGENATED LIQUID MEDIUM
Michael Raymond Clarke, West Footscray, Melbourne, Victoria, Australia, and Cecil Edwin Henry Bawn, Prenton, Birkenhead, England, assignors to Monsanto Chemicals Limited, London, England, a British company
No Drawing. Filed July 22, 1959, Ser. No. 828,687
Claims priority, application Great Britain Aug. 7, 1958
11 Claims. (Cl. 260—88.2)

This invention relates to the production of solid polymers and copolymers of ethylenically unsaturated hydrocarbons, for instance ethylene or propylene.

A great deal of attention has been paid in recent years to the polymerisation of ethylenically unsaturated hydrocarbons to form solid plastic materials, and especially to the polymerisation of ethylene. The precise character of a polyethylene depends very much upon the conditions under which the ethylene is polymerised, and the optimum conditions for carrying out the polymerisation have been the subject of much research work. The early processes did of course employ a high temperature of perhaps up to 300° C. and a high pressure for instance in the region of 1200 atmospheres. These high pressure processes have been used for many years but more recently methods have become available in which owing to the use of extremely active catalysts milder polymerisation conditions have been possible. In general this means that lower operating pressures are effective, and consequently the use of an expensive high pressure plant can be avoided. Moreover, the resulting polyethylenes tend to have properties which are more desirable in certain applications than the properties of conventional high pressure or thermal polyethylene; in particular the density is higher and the material is therefore more rigid.

The more active catalysts that have been suggested for use in low pressure processes are however in many instances fairly complex bodies, which are expensive as they are not readily available and need to be prepared especially for the purpose.

It has now been discovered that ordinary aluminium halides if they are used with certain simple mercury derivatives and employed in the presence of certain liquid media are very effective catalysts for the polymerisation of ethylene and other ethylenically unsaturated hydrocarbons to solid polymers and copolymers.

The process of the invention is one for the production of a solid polymer or copolymer, in which the polymerisation of an ethylenically unsaturated hydrocarbon is carried out using a catalyst that comprises an aluminium halide and an aromatic mercury compound and in the presence of a liquid medium that comprises a halogenated liquid or an organic substance forming a halogenated liquid by interaction with the catalyst. By means of the process polymers and copolymers, and especially polymers of ethylene, can be obtained having a high degree of linearity; ethylene polymers for instance can be produced which have properties approaching those of polymethylenes.

The aluminium halide component of the catalyst is preferably aluminium chloride or bromide, and a mixture of aluminium halides can be employed if desired.

The other component, the aromatic mercury compound, is preferably an arylmercury compound, that is to say a mercury derivative that contains at least one aryl group in which a carbon atom of the aryl nucleus is linked to a mercury atom. Typical members are phenylmercurys, and substituted phenylmercurys in which the phenyl group contains a substituent, for example a chlorine atom or a lower alkyl group such as for instance a methyl group. Excellent results are obtained with diphenylmercury itself, and with di-(p-tolyl)mercury. The arylmercury compounds can also contain substituents attached to mercury, as in phenylmercurichloride and p-tolylmercurichloride. A mixture of more than one aromatic mercury compound can be employed with the aluminium halide.

A preferred catalyst is aluminium chloride, or more particularly aluminium bromide, used with diphenylmercury itself or a derivative in which the phenyl group carries a substituent.

The process of the invention can advantageously be employed in the polymerisation of a wide variety of ethylenically unsaturated hydrocarbons, although it is particularly useful in polymerising olefins, such as ethylene and propylene. Other olefins which can be used are for instance the butylenes and pentenes. Moreover, the ethylenically unsaturated hydrocarbon can be a diene, for instance a butadiene such as 1:3-butadiene. Aromatic members of the specified class of hydrocarbons are the vinylbenzenes, for instance styrene itself and α-methylstyrene. More than one ethylenically unsaturated hydrocarbon can be polymerised at the same time, so that copolymerisation takes place and a copolymer is formed. In this way there can for instance be prepared an ethylene/propylene copolymer or a styrene/butadiene copolymer.

The process is particularly valuable for the production of solid polyethylenes and solid polypropylenes by polymerisation of ethylene and propylene respectively. For instance polyethylenes of a wide range of physical properties can be produced, including those in the "medium density" range, density at 22° C. between 0.920 and 0.935, and the "high density" range, density at 22° C. above 0.935. The high density range includes polyethylene with a density between 0.95 and 0.98 at 22° C., for instance 0.96. The polymers of higher density (say 0.95 and above) are very linear in character and have properties approaching those of polymethylenes. The melting point of the higher density polyethylenes is higher than that of conventional thermal polyethylene, and polyethylenes can for instance be obtained which have a Vicat softening point of at least 115° C., for instance 130° C. or even higher.

The liquid medium preferably comprises a chlorinated or brominated liquid, and particularly a chlorinated or brominated organic liquid. Excellent results are obtained with a chlorinated or brominated aliphatic hydrocarbon, for example a chloro-alkene or bromo-alkene such as for instance trichloroethylene or tetrachloroethylene; or a chloro-alkane or bromo-alkane such as for instance ethyl chloride, tert.-butyl chloride, chloroform, carbon tetrachloride or ethylene dibromide. If a halogenated liquid is not used as such in the first instance as the liquid medium then a suitable organic substance to employ is for example a branched chain aliphatic hydrocarbon. For instance a branched chain alkane is capable of reacting with aluminium chloride or bromide to give a chlorinated or brominated hydrocarbon. Thus there can be employed a commercially available "pure" n-alkane (such as "pure" n-decane) which does in fact contain about 10% of branched chain alkanes; the branched chain components then react with the aluminium halide to form a quantity of a halogenated hydrocarbon. In general, however, the indirect formation of a halogenated liquid by reaction of a branched chain hydrocarbon in the reaction mixture is not a preferred method of operation, because a complex interaction takes place between the aluminium halide and the branched chain hydrocarbon and some of the byproducts formed, particularly the Friedel-Crafts oils or complexes, hinder the required polymerisation process. When a halogenated liquid is employed as the liquid medium it does in many instances form a loose association with the aluminium chloride or bromide, but this is not a Friedel-Crafts complex, and does not adversely affect the polymerisation process. Examples of suitable halogenated inorganic liquids are stannic tetrachloride and silicon tetrachloride.

The system comprising the liquid medium and the catalyst can be heterogeneous or homogeneous, but usually it will be found preferable to use a heterogeneous system, particularly if a crystalline type of polymer is desired. In the heterogeneous system the catalyst should of course be in a finely-divided form. The catalyst can if desired be supported on an inert carrier, for instance charcoal or silica gel. The two compounds can be each deposited on the carrier by the usual means, for instance by impregnating the carrier with a solution of the components and then drying the carrier. Alternatively where a liquid medium is employed which dissolves the aluminium halide component, say aluminium bromide, but not the other component, say p-tolylmercurichloride, then a solution of the aluminium bromide in the liquid medium can be added to the carrier that has been impregnated with the mercury derivative. In these circumstances despite the fact of the inherent solubility the aluminium bromide is withdrawn from solution and becomes adsorbed on the insoluble mercury derivatives on the carrier. The same phenomenon also occurs in the absence of a carrier, e.g. if a solution of aluminium bromide in the liquid medium is added to finely-divided solid p-tolylmercurichloride the aluminium bromide becomes adsorbed on the particles of the insoluble mercury derivative.

The proportions in which the two catalyst components are employed are not critical, and excellent results can be obtained when these are equimolecular or when an excess of either the aluminium halide or the aromatic mercury compound is present. Preferably however an excess of the mercury compound is used; for instance the mol. ratio of the aluminium halide to the mercury component can range respectively from 1:1.5 to 1:3 or even to 1:10 or 1:20.

Owing to the activity of the catalyst employed the process of the invention can be operated under relatively low pressures and at temperatures close to atmospheric, with all the advantages attendant on this. Thus the polymerisation can be usefully conducted between 15° and 45° C., say between 20° and 40° C. Temperatures both lower (for instance from 0° or 5° to 15° C.) and higher (for instance up to 50° or 60° C.) can however be effective in certain instances. The pressure can be as low as 1 atmosphere, but is conveniently up to say at least 30 to 50 atmospheres. Often it is preferable to use pressures up to some hundreds of atmospheres (for instance 200 or 300 atmospheres), pressures which are still relatively "low" compared with those needed in making what is known as high pressure or thermal polyethylene.

Preferably the process is operated under anhydrous conditions, since in general water will interfere with the catalyst employer. Small quantities of water can however be tolerated. The presence of small amounts of oxygen for instance in the form of air does not appear to affect the course of the polymerisation.

In a typical procedure the process of the invention is carried out by mixing the catalyst components with the liquid medium under anhydrous conditions, and then passing in the dry ethylenically unsaturated hydrocarbon in gas or vapour form. Preferably the system is agitated whilst the polymerisation is taking place. The polymerisation product can be recovered by washing the catalyst-containing mixture with a liquid that will dissolve the catalyst, for example in suitable instances water, hydrochloric acid, ethanol, or mixtures of these materials. The polymer or copolymer is finally filtered off and dried.

The invention is illustrated by the following examples.

*Example 1*

This example describes the production of a linear polyethylene of density 0.96 by polymerisation of ethylene at atmospheric temperature and pressure using as catalyst aluminium bromide in the presence of diphenylmercury.

In a 250 cc. round-bottom flask there were placed 1 gram of finely-divided diphenylmercury and 100 cc. of a trichloroethylene solution (which had been made up a few hours previously) containing 0.4 gram of aluminium bromide. The flask was set up so that it could be agitated mechanically and at the same time remain connected to a source of ethylene at atmospheric pressure. After first evacuating the flask to de-gas the contents it was connected to the ethylene source so that ethylene was admitted at atmospheric pressure and the flask was then shaken at 500 times per minute at 20° C. until no further absorption of ethylene took place. As the polymerisation proceeded white flocks of solid polyethylene appeared suspended in the trichloroethylene, and when ethylene absorption had stopped the polymer-containing mixture was poured into 500 cc. of hydrochloric acid solution obtained by mixing 1 volume of concentrated hydrochloric acid with 9 volumes of ethyl alcohol. The mixture of polymer and the acid solution was stirred together for 3 hours to ensure complete dissolution of the catalyst from the polymer, and the polymer was then filtered off and dried under reduced pressure to remove both water and traces of organic solvents.

In this way there were obtained 14 grams of a rigid polyethylene, which had a density of 0.96 (measured at 22° C.) and a Vicat softening point of 130° C. The fact that it was highly linear in character was confirmed by examination of its infra-red absorption spectra.

*Example 2*

This example also describes the production of a linear polyethylene, using as the liquid medium a saturated aliphatic hydrocarbon fraction (boiling range 172° to 175° C.) that contained about 10% of branched chain paraffin hydrocarbons.

As described in Example 1 ethylene was polymerised using as catalyst the mixture obtained by adding 30 cc. of the n-decane to 2 grams of finely-divided aluminium bromide and 2 grams of finely-divided diphenylmercury. The resulting polymer was isolated also as in Example 1.

There was obtained 0.5 gram of a rigid polyethylene; an examination of the infra-red absorption spectra showed it to be a highly linear polyethylene, and the product was generally similar to the crystalline polyethylene of Example 1.

*Example 3*

This example describes the production of a solid polyethylene using stannic tetrachloride as the liquid medium in place of the trichloroethylene of Example 1.

As described in Example 1 ethylene was polymerised using as catalyst the mixture obtained by adding 30 cc. of stannic tetrachloride to 1 gram of finely-divided aluminium bromide and 2 grams of finely-divided diphenylmercury.

There were isolated as described in Example 1 12 grams of a rigid polyethylene.

*Example 4*

This example describes the production of a solid polyethylene by polymerization of ethylene using as catalyst aluminium bromide in the presence of p-tolylmercurichloride.

As described in Example 1 ethylene was polymerized using as catalyst the mixture obtained by adding 30 cc. of a solution containing 0.8 gram of aluminium bromide (in the aliphatic hydrocarbon fraction containing some branched chain hydrocarbons used in Example 2) to 2 grams of finely-divided p-tolylmercurichloride.

There was isolated in the usual way 0.5 gram of a rigid polyethylene.

*Example 5*

This example describes the polymerization of styrene to give a solid polymer.

The catalyst consisted of 0.26 gram of finely-divided diphenylmercury suspended in 100 cc. of trichloroethylene containing 0.5 gram of dissolved aluminium bromide; this was contained in a 250 cc. round-bottomed flask, the air from which had been removed and replaced by nitrogen. 9 grams of monomeric styrene were admitted into the flask, which was then agitated mechanically at 0° C. temperature for 2 hours and finally for 30 minutes at 45° C.

After working up in the usual way there were obtained 8.5 grams of a hard polystyrene.

What is claimed is:

1. In a process for polymerising an ethylenically-unsaturated hydrocarbon of the group consisting of an alkene containing 2–5 carbon atoms, butadiene, styrene, alpha-methylstyrene, and mixtures thereof at 0–60° C. under a pressure of 1–300 atmospheres, the improvement which comprises conducting the polymerisation in contact with a catalyst consisting of (*a*) an aluminum halide of the group consisting of aluminum bromide, aluminum chloride, and mixtures thereof and (*b*) a mercuric compound of the group consisting of diphenylmercury, ditolylmercury, di(ar-chlorophenyl)-mercury, phenylmercurichloride, tolylmercurichloride, ar-chlorophenylmercurichloride, and mixtures thereof in the presence of a liquid medium of the group consisting of chloroalkanes, chloroalkenes, bromoalkanes, bromoalkenes, stannic tetrachloride, and silicon tetrachloride.

2. A polymerisation process according to claim 1 wherein the aluminum halide is aluminum bromide.

3. A polymerisation process according to claim 1 wherein the aluminum halide is aluminum chloride.

4. A polymerisation process according to claim 1 wherein the mercuric compound is diphenyl mercury.

5. A polymerisation process according to claim 1 wherein the mercuric compound is p-tolylmercurichloride.

6. A polymerisation process according to claim 1 wherein the liquid medium is trichloroethylene.

7. A polymerisation process according to claim 1 wherein the liquid medium is stannic tetrachloride.

8. A polymerisation process according to claim 1 wherein the liquid medium is formed by interaction of a branched chain aliphatic hydrocarbon with the aluminum halide of the catalyst.

9. A polymerisation process according to claim 1 wherein the ethylenically unsaturated hydrocarbon is ethylene.

10. A polymerisation process according to claim 1 wherein the ethylenically unsaturated hydrocarbon is a mixture of ethylene and propylene.

11. A polymerisation process according to claim 1 wherein the ethylenically unsaturated hydrocarbon is styrene.

References Cited in the file of this patent

UNITED STATES PATENTS

| | | |
|---|---|---|
| 2,886,561 | Reynolds et al. | May 12, 1959 |
| 2,899,415 | Truett | Aug. 11, 1959 |
| 2,905,645 | Anderson et al. | Sept. 22, 1959 |
| 2,989,487 | Truett | June 20, 1961 |

FOREIGN PATENTS

| | | |
|---|---|---|
| 1,007,999 | Germany | May 9, 1957 |